(12) United States Patent  (10) Patent No.: US 7,049,966 B2
Carrender  (45) Date of Patent: May 23, 2006

(54) FLAT ANTENNA ARCHITECTURE FOR USE IN RADIO FREQUENCY MONITORING SYSTEMS

(75) Inventor: Curtis Lee Carrender, Morgan Hill, CA (US)

(73) Assignee: Battelle Memorial Institute K1-53, Richland, WA (US)

( * ) Notice: Subject to any disclaimer, the term of this patent is extended or adjusted under 35 U.S.C. 154(b) by 236 days.

(21) Appl. No.: 10/698,005

(22) Filed: Oct. 30, 2003

(65) Prior Publication Data

US 2005/0093700 A1    May 5, 2005

(51) Int. Cl.
*G08B 13/14* (2006.01)

(52) U.S. Cl. .............................. 340/572.7; 343/700 MS

(58) Field of Classification Search ............. 340/572.7; 343/700 MS
See application file for complete search history.

(56) References Cited

U.S. PATENT DOCUMENTS

| | | | |
|---|---|---|---|
| 4,724,443 A | 2/1988 | Nysen ................. | 343/700 MS |
| 4,739,328 A | 4/1988 | Koelle et al. ................. | 342/44 |
| 4,782,345 A | 11/1988 | Landt .......................... | 343/727 |
| 4,786,907 A | 11/1988 | Koelle ......................... | 342/51 |
| 4,816,839 A | 3/1989 | Landt .......................... | 343/795 |
| 4,821,041 A | 4/1989 | Evans ................. | 343/700 MS |
| 4,835,377 A | 5/1989 | Brown ......................... | 235/492 |
| 4,853,705 A | 8/1989 | Landt .......................... | 343/803 |
| 5,245,745 A | 9/1993 | Jensen et al. .................. | 29/600 |
| 5,294,159 A | 3/1994 | Corrigan ...................... | 292/258 |
| 5,394,159 A | 2/1995 | Schneider et al. ... | 343/700 MS |
| 5,912,622 A | 6/1999 | Endo et al. .............. | 340/572.5 |
| 5,995,048 A | 11/1999 | Smithgall et al. ..... | 343/700 MS |
| 6,049,278 A * | 4/2000 | Guthrie et al. ........... | 340/572.7 |
| 6,181,279 B1 | 1/2001 | Van Hoozen ........ | 343/700 MS |
| 6,259,369 B1 | 7/2001 | Monico .................... | 340/572.8 |
| 6,278,369 B1 * | 8/2001 | Smith et al. ............. | 340/572.7 |
| 6,329,915 B1 * | 12/2001 | Brady et al. ............. | 340/572.7 |
| 2001/0000430 A1 | 4/2001 | Smith et al. ............. | 340/572.1 |

* cited by examiner

*Primary Examiner*—Thomas Mullen
(74) *Attorney, Agent, or Firm*—Seed IP Law Group PLLC

(57) ABSTRACT

A flat antenna architecture for use in radio frequency monitoring systems including a patch antenna configured for use on a conductive surface of an object to be monitored. The patch antenna includes a conductive patch formed on a first surface of a dielectric base and an opposing surface on the dielectric base configured for attachment to the reflective surface of an object. This provides a patch antenna of relatively thin makeup having a lower cost and lower overall thickness and corresponding lower weight.

24 Claims, 3 Drawing Sheets

FLAT ANTENNA ARCHITECTURE FOR USE IN RADIO FREQUENCY MONITORING SYSTEMS

BACKGROUND OF THE INVENTION

1. Field of the Invention

The present invention pertains to radio frequency devices and, more particularly, to a patch antenna configuration for use on a conductive surface of an object to be monitored.

2. Description of the Related Art

Communication using a passive (non-powered) device where an interrogation signal is modulated and reflected by the passive device is known. One example of this form of communication is in the radio frequency identification (RFID) and auto identification technologies, which use backscatter communication.

Backscatter communications involves selectively changing and reflecting a received signal. For example, modulating the radar cross-section of a target causes energy reflected off the target to contain the information in its phase or amplitude modulation. A unit receiving the reflected energy, typically called a "reader," which usually has supplied the original energy required for this communication, is configured to extract the data in the signal by comparing the received reflected signal to the original interrogation signal.

By way of analogy, a reader in the form of a flashlight has its beam of light aimed at a person with a mirror. The individual with the mirror begins selectively reflecting the flashlight's beam back to the flashlight. The selective reflection can be done in a digital fashion, i.e., off and on. This allows the person holding the mirror to communicate without the necessity of generating additional energy.

In RFID technology, commercial backscatter communications systems utilize microwave frequencies. This technology, which has been available for several decades, uses a target, called a "tag," to respond to an interrogation signal for identification purposes.

More particularly, and by way of example, referring to FIG. 1, shown therein is a basic RFID system 10 that includes three components, an antenna 12, a transceiver with decoder 14, and a transponder or tag 16 having its own antenna 18. In operation, the transceiver 14 generates electro-magnetic radio signals 22 that are emitted by the antenna 12 and are received by the tag 16. When the tag 16 is activated by the signal, data can be read from or written to the tag 16.

In certain applications, the transceiver antenna 12 is a component of the transceiver and decoder 14, which makes it an interrogator 20 (or reader), and which can be configured either as a hand-held or fixed-mount device. The interrogator 20 emits the radio signals 22 in a range from one inch to 100 feet or more, depending upon its power input and the radio frequency used. When the RF tag 16 passes through the radio signals 22, the tag 16 detects the signal 22 and is activated. Data encoded in the tag 16 is then transmitted through reflection by a modulated data signal 24 through the antenna 18 in the tag 16 and to the interrogator 20 for subsequent processing.

RFID tags that are powered by the interrogation signal are often referred to as a passive device because they derive the energy needed for operation from the radio frequency energy beamed at it. The tag rectifies the field and dynamically changes the reflective characteristics of the tag antenna, creating a change in reflectivity that is seen at the interrogator. In contrast, a battery-powered semi-passive RFID tag operates in a like fashion, modulating its RF cross-section in order to reflect a delta to the interrogator to develop a communication link. Here, the battery is the source of the tag's operational power. In an active RFID tag, a transmitter is used to create its own radio frequency energy powered by the battery.

Conventional continuous wave backscatter RF tag systems that utilize passive (no battery) RF tags require adequate power from the signal 22 to power the tag's internal circuitry used to modulate the signal back to the interrogator 20. Efficient collection of this energy from the signal 22 is necessary to maximize system performance. Impedance matching of antenna circuit components at the desired frequency is one method to optimize efficiency. However, size and performance constraints of RFID tag systems render existing impedance matching designs infeasible. Another disadvantage is the restrictions imposed on signal power and data flow in the RF signals by government regulation.

Known antenna configurations used on radio frequency identification applications include dipole antennas and patch antennas. Microstrip patch antennas are well known because of their relatively thin makeup, making them ideal for use in tagging almost any object.

Patch antennas typically consist of a dielectric substrate having a ground plane formed on one surface and a patch formed on an opposing surface that receives and radiates signals. The size and shape of the patch is designed to accommodate the operating frequency of the circuit to which the patch antenna is coupled, and it is typically designed to provide a suitable radiation resistance.

Because typical radio frequency identification systems operate on high frequencies, the patch antenna can be of a relatively very small size, enhancing its use in applications where weight and size are important. The antenna is associated with a tag or transponder that has a code stored therein, typically in binary format. This code is used by the tag hardware to modulate an interrogation signal and radiate the modulated signal back to the source of the interrogation signal. In other configurations, the transponder antenna receives a signal from a reader and stores data or alters data stored in the transponder, as well as backscatter modulating the received signal back to the reader in order to pass information to the reader. The reader then decodes the signals, as described above, to obtain information from the transponder.

While patch antennas have generally performed well, they suffer from certain limitations. One drawback is the limited range of transmission of the signals from the transponder to the reader. Another difficulty arises from radio frequency interference. Interference can be produced from the transponder's antenna itself or from surrounding objects, including the object on which the transponder is attached. Such interference can prevent the reader from properly detecting the pattern of binary information radiated to it from the tag.

In many cases, attaching a tag antenna to a conductive object can severely degrade the performance of the tag's antenna or completely prevent backscatter modulation of a received signal. Hence, there is a need for an antenna architecture that can be used with conductive objects without increasing weight or size.

BRIEF SUMMARY OF THE INVENTION

The disclosed embodiments of the invention are directed to radio frequency communication between two devices in which one device has an antenna configured to be mounted on and electrically coupled to a conductive object or a
} conductive surface of an object. Preferably, a patch antenna configuration is used in which a conductive back or ground plane is replaced by the conductive surface of the object to be tagged.

In one embodiment of the invention, an antenna for use on an object having a conductive surface is provided, the antenna includes a patch antenna circuit, and means for attaching the patch antenna circuit to the conductive surface of the object, such as a conductive adhesive strip, fasteners, adhesive, and other known attachment devices and methods.

In accordance with another aspect of the invention, a communication device for use with an object having a conductive surface is provided. The device includes an electronic circuit configured to receive an interrogation signal and to generate a modulated signal in response to the interrogation signal; and an antenna circuit coupled to the electronic circuit and configured for attachment to the conductive surface of the object and to use the conductive surface of the object as a component of the antenna circuit to receive the interrogation signal and to radiate the modulated signal.

In accordance with another aspect of the invention, a tagged object for use in radio frequency communication is provided. The object has an electrically conductive surface on which is mounted a communication device, which includes the electronic circuit configured to receive an interrogation signal and to generate a modulated signal in response to the interrogation signal; and an antenna circuit coupled to the electronic circuit and configured for attachment to the conductive surface of the object and to use the conductive surface as a component of the antenna circuit to receive the interrogation signal and to radiate the modulated signal.

In accordance with another aspect of the invention, a communication system for use in monitoring an object formed of a conductive material is provided, the system including a first communication device configured to generate an interrogation signal and to receive a modulated signal in response thereto; and a second communication device having an electronic circuit configured to receive the interrogation signal and to generate the modulated signal in response to the interrogation signal. The second communication device includes an antenna coupled to the electronic circuit and to the conductive material of the object and configured to use the conductive material of the object as a component of the antenna to receive the interrogation signal and to radiate the modulated signal.

In accordance with another aspect of the invention, a monitoring system is provided that includes an object to be monitored, the object having a conductive surface;

a first communication device configured to transmit an interrogation signal and to receive a modulated signal in response thereto; and a second communication device configured to receive the interrogation signal and to generate the modulated signal in response to the interrogation signal, and an antenna circuit coupled to the receiver circuit and configured for attachment to the conductive surface of the object to use the conductive surface of the object as a component of the antenna circuit to receive the interrogation signal and to radiate the modulated signal.

BRIEF DESCRIPTION OF THE SEVERAL VIEWS OF THE DRAWINGS

The foregoing and other features and advantages of the present invention will be more readily appreciated as the same become better understood from the following detailed description when taken in conjunction with the accompanying drawings, wherein.

DETAILED DESCRIPTION OF THE INVENTION

Figure 1:
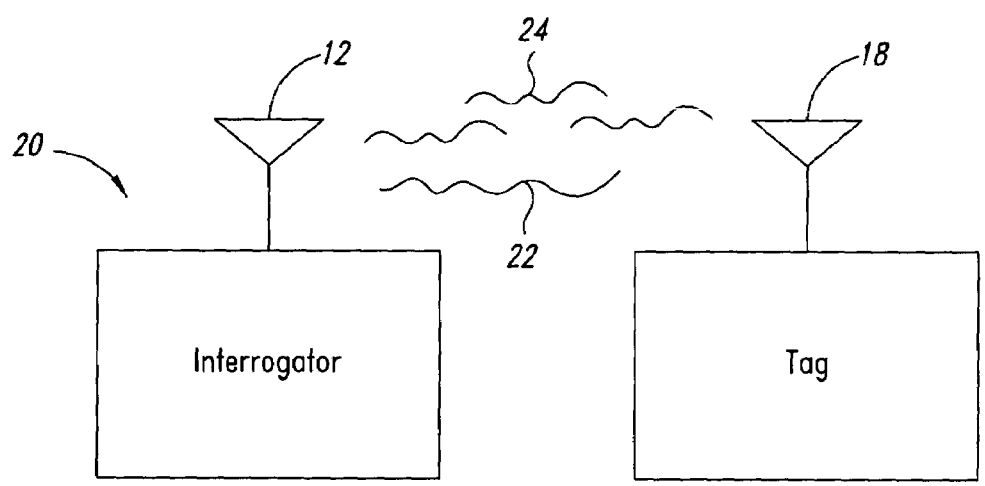
FIG. 1 is a diagram illustrating a basic RFID system.
Figure 2:
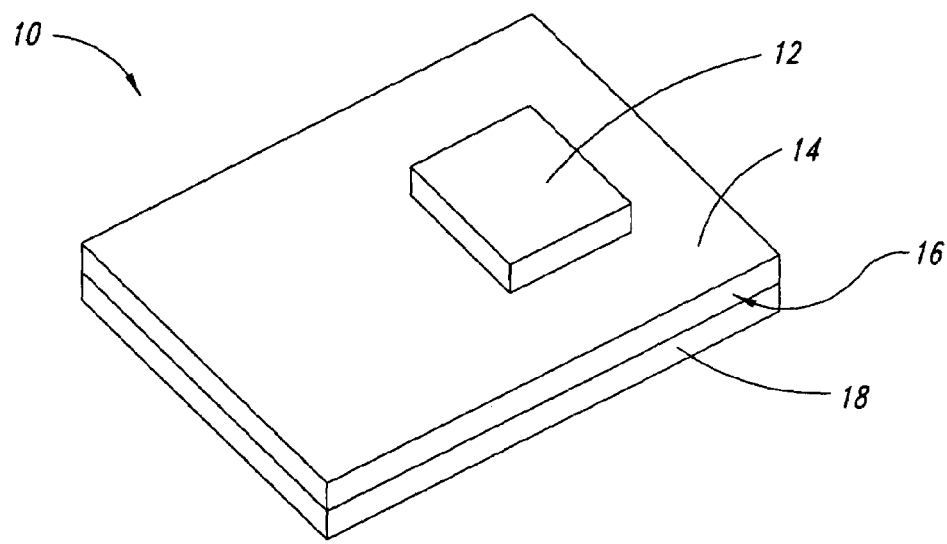
FIG. 2 is an isometric view of a known patch antenna.

Referring initially to FIG. 2, shown therein is a patch antenna design 10 formed in accordance with known methods. This antenna 10 includes the patch 12 formed on a first side 14 of a dielectric base 16, which has a conductive back 18 formed on an opposing side thereof. According to known methods, the patch 12 can be formed as a thick-film microwave patch that is patterned onto the surface 14 of a dielectric substrate 16, and the conductive back 18 is formed on an opposing surface thereof. A coaxial conductor has leads coupled to the respective patch 12 and conductive back 18, which is not shown but is well known to those skilled in the art.

Known patch antennas can be bulky, which increases their size and weight, limiting their use on radio frequency identification tags.

Figure 3:
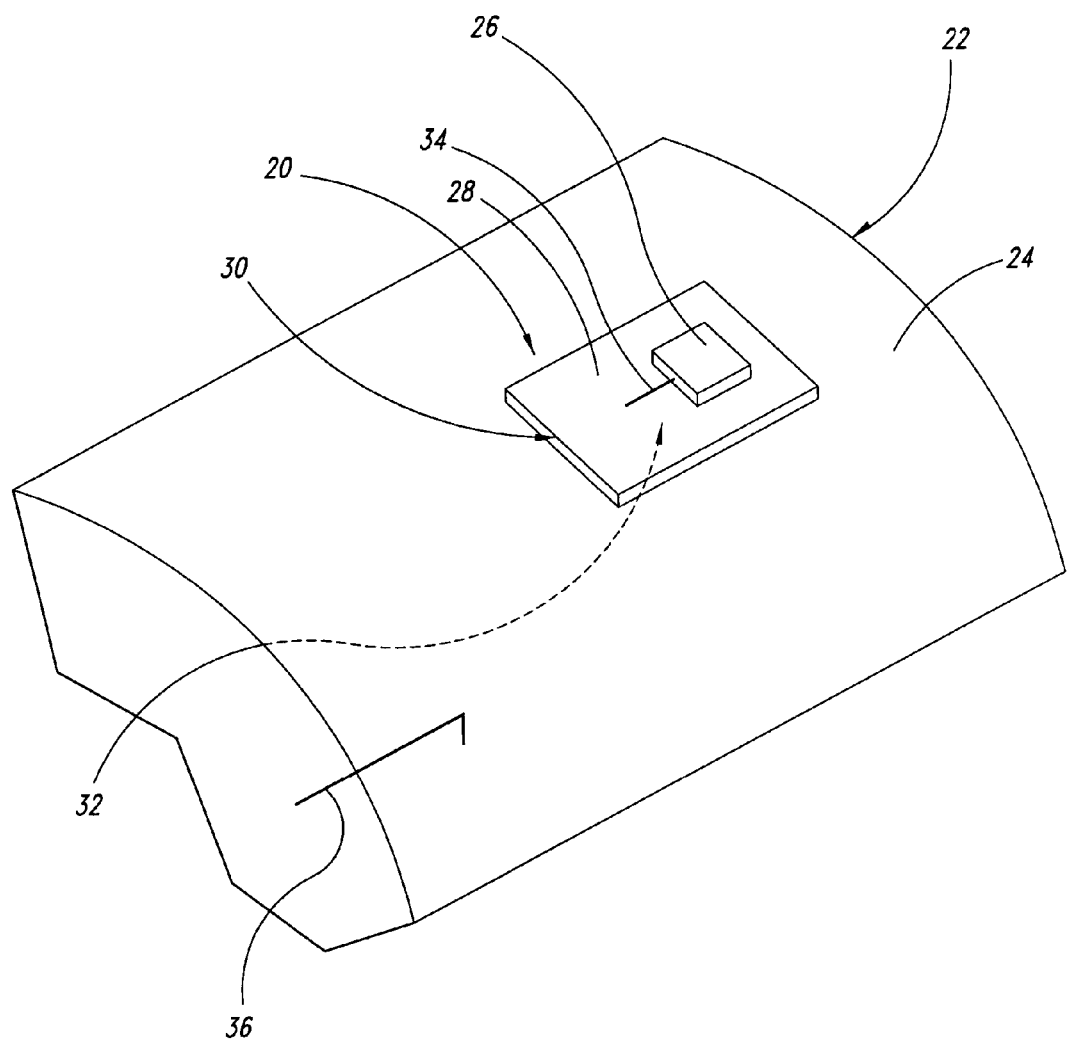
FIG. 3 is an isometric projection of a flat antenna architecture for use in radio frequency monitoring systems as applied to the conductive surface of an object.

FIG. 3 is a diagram illustrating a flat antenna architecture 20 for use with RFID tags used in systems for monitoring objects, such as an object 22 to which the antenna 20 is attached. In this case, the object 22 has a conductive surface 24 that conducts electric current and is receptive to radio frequency signals. It is to be understood that the antenna 20 and the object 22 shown in FIG. 3 are not in proportion and are shown for illustrative purposes only. As shown in FIG. 3, the antenna circuit 20 includes a conductive patch antenna 26 formed on a first surface 28 of a dielectric base 30. An opposing side 32 of the dielectric base is attached directly to the conductive surface 24 of the object 22 by suitable means. This can include adhesive, fasteners, or other known devices and methods.

A first conductive lead 34 extends from the patch antenna 26 and a second conductive lead 36 extends from the reflective surface 24 of the object 22. These leads are configured to be coupled to a radio frequency receiver circuit, transmitter circuit, or transceiver circuit, as desired. The second conductive lead 36 can pass through the dielectric base to an associated receiver or transceiver circuit.

In this embodiment of the invention, the antenna 20 can be constructed to have a relatively thin makeup at a low cost and overall lower weight wherein the traditional conductive back 18 is eliminated. The conductive back is replaced by the conductive surface 24 of the object 22. The object 22 can be a can, luggage tag, or other object that is conductive or has a conductive media thereon.

Figure 4:
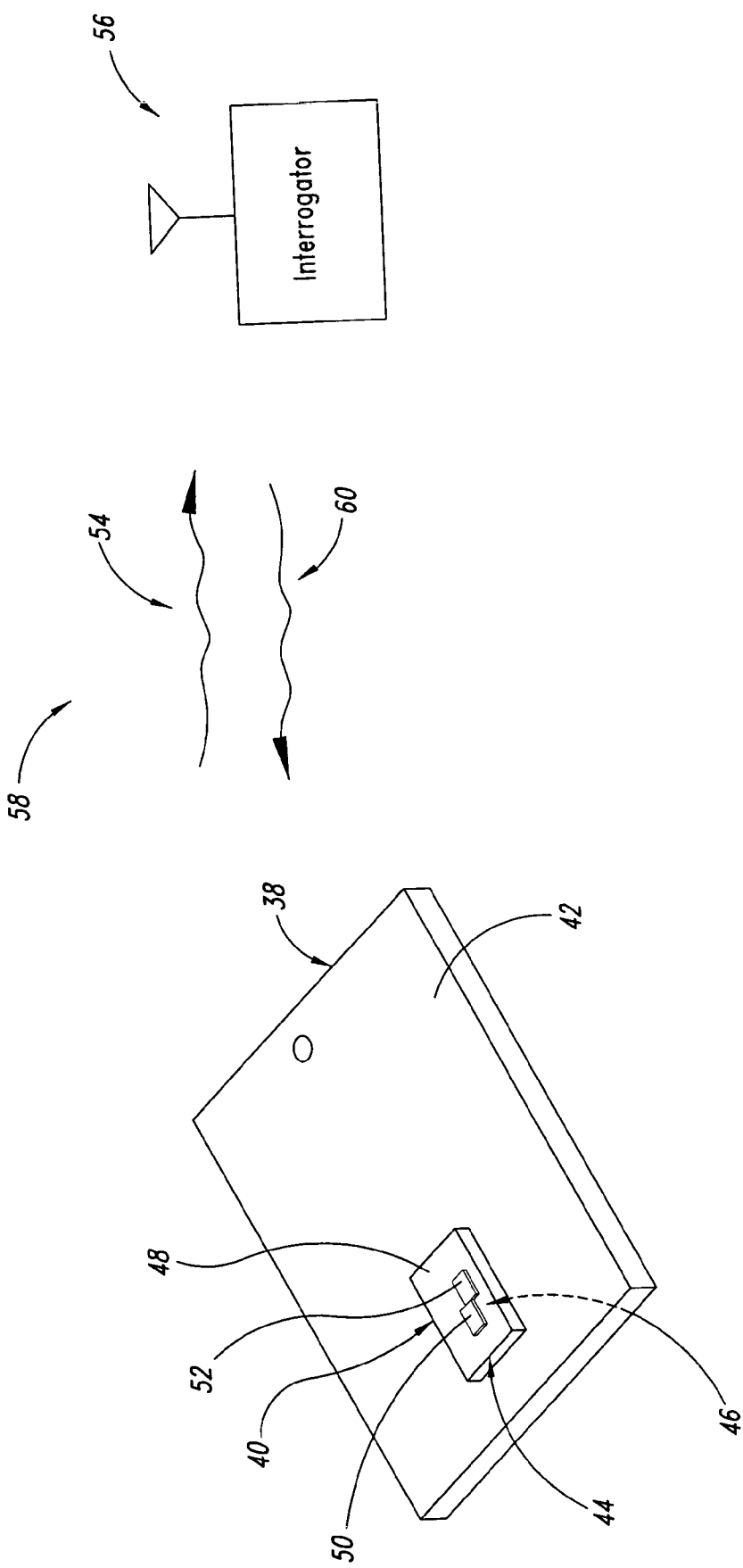
FIG. 4 is an isometric projection in combination with a block diagram of a system for monitoring objects utilizing a flat antenna architecture of the present invention.

FIG. 4 shows a system for monitoring objects that includes an object 38 having a radio frequency identification tag 40 attached to a reflective surface 42 thereof. It is to be understood that the object can be formed partially or completely of electrically conductive material, such as a metal can or luggage tag. In this case the tag is electrically coupled to the conductive material.

The radio frequency identification tag 40 includes a dielectric base 44 having a first side 46 attached to the reflective surface 42 of the luggage tag 38 and an opposing exposed surface 48. An electronic circuit 50 with associated patch antenna 52 formed in accordance with the present invention is formed on or attached to the exposed surface 48 of the dielectric base 44. Conductive leads (not shown) coupled the electronic circuit 50 to the antenna patch 52 and the reflective surface 42 in a known manner. As shown here, the reflective surface 42 forms part of an antenna circuit with the antenna patch 52 to receive interrogation signals 54 from a remote interrogator 56, which are part of a monitoring system 58. The antenna circuit formed of the patch antenna 52 and the reflective surface 42 is also configured to radiate a modulated backscatter signal 60 to the interrogator from the electronic circuit 50 responsive to the interrogation signal 54.

Ideally, the radio frequency tag is a passive tag that operates from the power of the interrogation signal 54. However, it is to be understood that the architecture of the present invention can be applied to semi-passive and active tags as desired.

While a preferred embodiment of the invention has been illustrated and described, it is to be understood that various changes may be made therein without departing from the spirit and scope of the invention. For example, the patch antenna circuit 20 shown in FIG. 3 may be formed to a different configuration to adjust the impedance and resonant frequency of the antenna circuit 20. In addition, a multiple-frequency antenna can be created by stacking patch antennas 26 and dielectric layers above the conductive surface 24 of the object 22. Hence, the invention is to be limited only by the scope of the claims that follow and the equivalents thereof.

The invention claimed is:

1. An antenna for use with an object having a conductive surface, the antenna comprising:
   a patch antenna circuit configured to receive an interrogation signal and to radiate a modulated signal;
   the patch antenna circuit comprising means for attachment to the conductive surface of the object, and a first conductive lead electrically coupled to the conductive surface of the object to use the conductive surface of the object as a functional element of the patch antenna circuit for receiving the interrogation signal and radiating the modulated signal.

2. The antenna of claim 1 wherein the patch antenna circuit comprises a patch antenna formed on a dielectric base.

3. The antenna of claim 2, comprising a second conductive lead coupled to the patch antenna.

4. The antenna of claim 3 wherein the dielectric base comprises an adhesive formed thereon for attaching the dielectric base to the conductive surface.

5. The antenna of claim 3 wherein the first conductive lead passes through the dielectric base.

6. The antenna of claim 1 wherein the object is a can or luggage tag.

7. A communication device for use with an object having a conductive surface, the communication device comprising:
   an electronic circuit configured to receive an interrogation signal and to generate a modulated signal in response to the interrogation signal;
   an antenna circuit coupled to the electronic circuit and configured for attachment to the conductive surface of the object to use the conductive surface as a component of the antenna circuit to receive the interrogation signal and to radiate the modulated signal;
   a patch antenna and a dielectric base; and
   a first conductive member coupled to the patch antenna and a second conductive member coupled to the conductive surface of the object.

8. The device of claim 7 wherein the dielectric base comprises an adhesive formed thereon for attaching the dielectric base to the conductive surface.

9. The communication device of claim 5 wherein the electronic circuit is powered by the interrogation signal.

10. The communication device of claim 7 wherein the electronic circuit is powered by a battery.

11. A tagged object for use in a radio frequency communication system, comprising:
    an electrically-conductive surface integrally formed as part of the tagged object;
    a communication device that comprises an electronic circuit configured to receive an interrogation signal and to generate a modulated signal in response to the interrogation signal;
    an antenna circuit coupled to the electronic circuit and attached to the electrically-conductive surface of the object to use the conductive surface as a component of the antenna circuit to receive the interrogation signal and to radiate the modulated signal, the antenna circuit comprising a patch antenna formed on a dielectric base; and
    a first conductive member coupled to the patch antenna and a second conductive member coupled to the conductive surface of the object.

12. The object of claim 11 wherein the dielectric base comprises an adhesive formed thereon for attaching the dielectric base to the conductive surface.

13. The object of claim 11 wherein the second conductive member passes through the dielectric base.

14. A communication system for use with an object formed of a conductive material, the system comprising:
    a first communication device configured to transmit an interrogation signal and to receive a modulated signal in response thereto; and
    a second communication device comprising an electronic circuit configured to receive the interrogation signal and to generate a modulated signal in response to the interrogation signal, and an antenna circuit coupled to the electronic circuit and attached to the object and electrically coupling to the conductive material of the object to use the conductive material as a component of the antenna circuit for receiving the interrogation signal and radiating the modulated signal.

15. The system of claim 14 wherein the patch antenna circuit comprises a patch antenna and a dielectric base.

16. The system of claim 15, further comprising a first conductive member coupled to the patch antenna and a second conductive member coupled to the conductive material of the object.

17. The system of claim 16 wherein the dielectric base comprises an adhesive formed thereon for attaching the dielectric base to the conductive material.

18. The system of claim 16 wherein the second conductive member passes through the dielectric base.

19. A monitoring system, comprising:
    an object to be monitored, the object formed of a conductive material;
    a first communication device configured to transmit an interrogation signal and to receive a modulated signal in response thereto; and
    a second communication device comprising an electronic circuit configured to receive an interrogation signal and to generate a modulated signal in response to the interrogation signal, and an antenna circuit coupled to the electronic circuit and attached to the object and electrically coupling to the conductive material the object to use the conductive material as a component of the antenna circuit to receive the interrogation signal and to radiate the modulated signal whereby a condition of the object is monitored by the first communication device.

20. The system of claim 19 wherein the patch antenna circuit comprises a patch antenna and a dielectric base.

21. The system of claim 20, further comprising a first conductive member coupled to the patch antenna and a second conductive member coupled to the conductive material of the object.

22. The system of claim 21 wherein the dielectric base comprises an adhesive formed thereon for attaching the dielectric base to the conductive material.

23. The system of claim 21 wherein the second communication device is at least one of a passive tag, semipassive tag, and active tag.

24. The system of claim 21 wherein the second conductive member passes through the dielectric base.

* * * * *